(12) United States Patent
Edwards et al.

(10) Patent No.: US 6,708,946 B1
(45) Date of Patent: Mar. 23, 2004

(54) BALL VALVE

(75) Inventors: Jeffrey Charles Edwards, Lound (GB); Gavin David Cowie, Banchory (GB)

(73) Assignee: Expro North Sea Limited (GB)

( * ) Notice: Subject to any disclaimer, the term of this patent is extended or adjusted under 35 U.S.C. 154(b) by 0 days.

(21) Appl. No.: 09/787,188

(22) PCT Filed: Sep. 15, 1999

(86) PCT No.: PCT/GB99/02886

§ 371 (c)(1),
(2), (4) Date: Jun. 7, 2001

(87) PCT Pub. No.: WO00/15943

PCT Pub. Date: Mar. 23, 2000

(30) Foreign Application Priority Data

Sep. 15, 1998  (GB) .............................................. 9819965

(51) Int. Cl.⁷ .............................................. F16K 25/00
(52) U.S. Cl. ......................................... 251/58; 251/192
(58) Field of Search .............................. 251/315.01, 58, 251/157, 159, 160, 192; 166/332.3

(56) References Cited

U.S. PATENT DOCUMENTS

| | | | | |
|---|---|---|---|---|
| RE25,471 E | * | 11/1963 | Fredd | 251/58 |
| 3,236,255 A | * | 2/1966 | Sizer | 251/58 |
| 3,743,015 A | * | 7/1973 | Mott | 166/323 |
| RE28,131 E | * | 8/1974 | Leutwyler | 251/58 |
| 3,901,321 A | | 8/1975 | Mott | 166/314 |
| 4,009,753 A | * | 3/1977 | McGill et al. | 166/319 |
| 4,144,937 A | * | 3/1979 | Jackson et al. | 251/58 |
| 4,352,366 A | * | 10/1982 | Fisher, Jr. | 166/321 |
| 4,368,871 A | * | 1/1983 | Young | 251/58 |
| 4,422,618 A | * | 12/1983 | Lawson | 251/58 |
| 4,448,216 A | * | 5/1984 | Speegle et al. | 251/58 |
| 4,469,180 A | | 9/1984 | Turner | 166/324 |
| 4,603,740 A | | 8/1986 | Edwards et al. | 166/319 |

FOREIGN PATENT DOCUMENTS

| | | |
|---|---|---|
| EP | 0679796 | 11/1995 |
| WO | WO9303255 | 1/1996 |

* cited by examiner

*Primary Examiner*—John Bastianelli
(74) *Attorney, Agent, or Firm*—Gifford, Krass, Groh, Sprinkle, Anderson & Citkowski, P.C.

(57) ABSTRACT

A ball valve (10) is described which has a ball valve retaining mechanism which, when subject to very slight movement, allows a ball element (20) to be unloaded off a valve seat (48) during rotation, but remain in contact with the valve seat (48) so as to prevent debris ingress between the ball and the valve seat, and to instantaneously reload onto the valve seat upon the event of closure. This instantaneous and automatic redirection of the reaction load path at the occurrence of closure provides an effective seal against high pressure aggressive fluids to prevent fluid escaping beyond the valve components whilst, at the same time, allowing effective rotational movement of the valve to occur without providing rotational reliability. This solution allows conflicting load paths through the valve to be resolved, namely through the trunnion during rotation and through the valve seat during sealing.

12 Claims, 5 Drawing Sheets

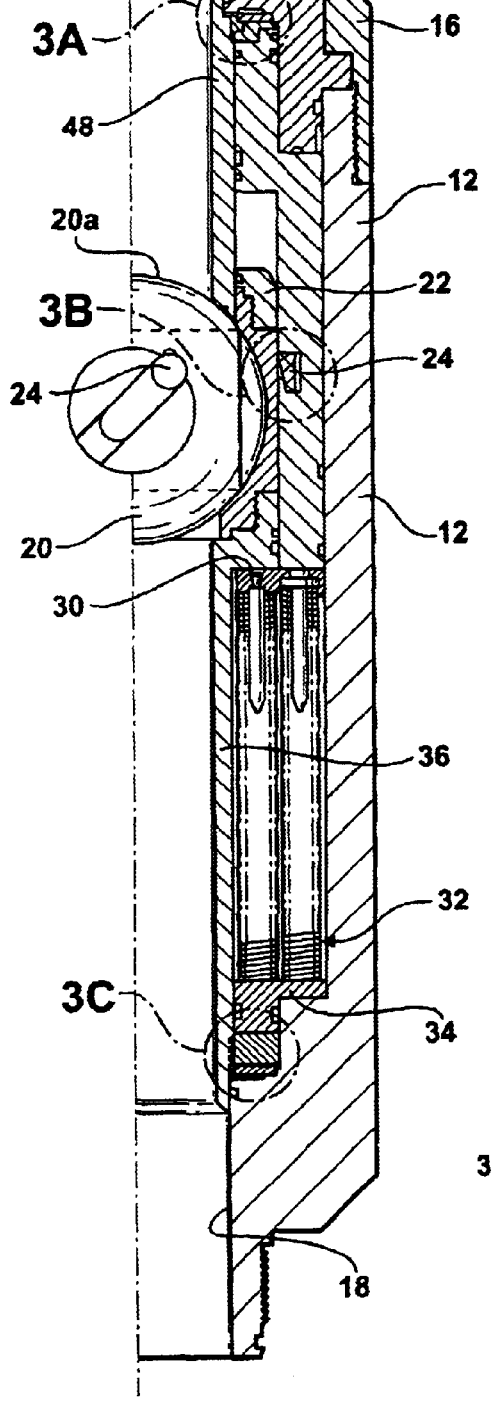
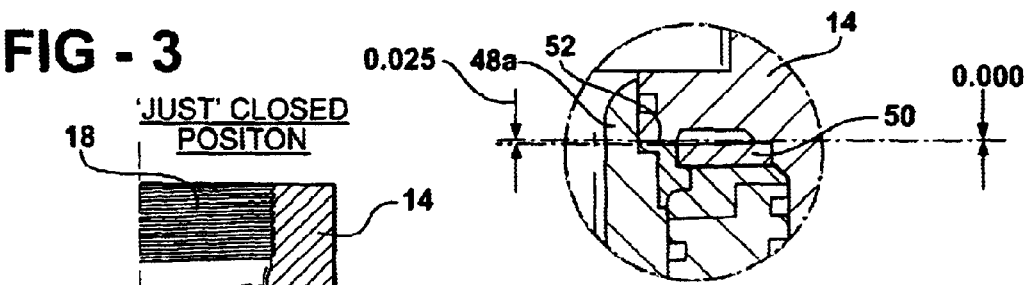
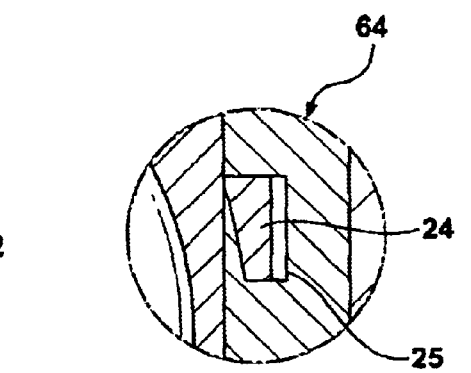
FIG - 3
FIG - 3A
FIG - 3B
FIG - 3C

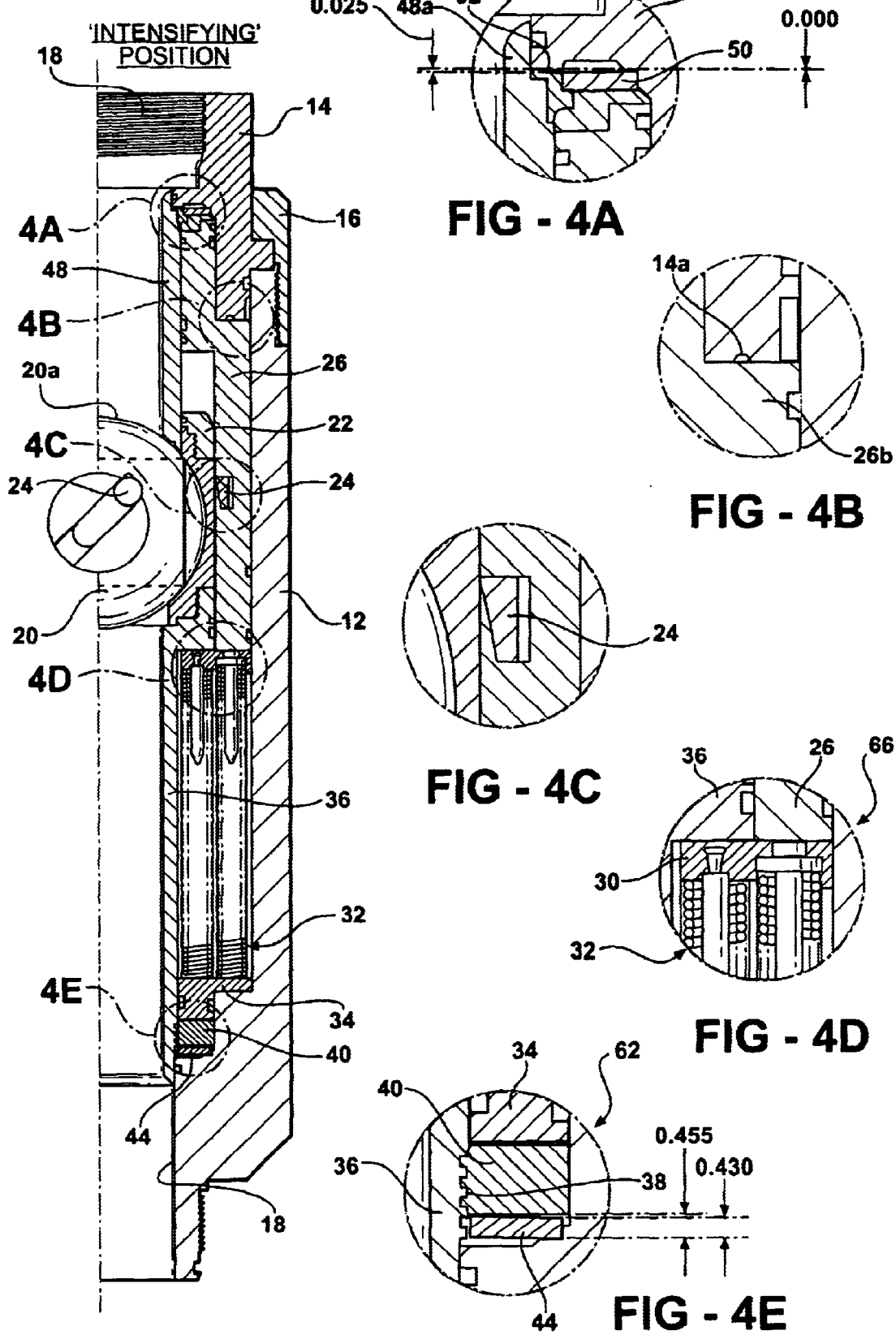

BALL VALVE

FIELD OF THE INVENTION

The present invention relates to a valve for controlling the flow of the fluid through a bore and particularly, but not exclusively, the invention relates to a ball valve for use in the oil and chemical process industry.

BACKGROUND OF THE INVENTION

Ball valves are commonly used in both industries. The type of ball valve of interest in relation to controlling flow of a fluid is an apertured ball valve such as is disclosed in applicant's co-pending published Patent Application No. WO 93/03255 which was published on Feb. 18, 1993. In an apertured ball valve the valve operation or function may be broken down into two separate stages. Firstly, the ball moves between an open and a closed position by rotating through 90° such that the ball aperture from an orientation coaxial with the flow direction, i.e. when the valve is open, to a position whereby the ball aperture is normal or perpendicular to the flow direction. Secondly, the valve seals in the closed position to prevent flow through the bore across the ball valve. Therefore, the on-off control of flow through the valve is achieved by rotating the ball through 90° within the valve housing.

There are two basic types of ball valve mechanism which currently exist which fulfil the above functions. Firstly, there is the trunnion mounted ball system in which the ball element is positionally constrained inside the valve, usually by radial bearings. The ball is rotated by the application of torque to the trunnion. Sealing occurs as a result of the valve seat "floating" onto the ball element. The advantage of this system is that it provides highly reliable rotation between the valve open and the closed positions. The principal disadvantage of this system is that seal reliability is reduced because the sealing force only develops in proportion to the annular area of the valve seat. Thus, when trunnion mounted ball systems are used in high pressure wells and especially those in which the well fluid has a high proportion of particulate matter, being generally known as "aggressive" wells, the pressure is such that the particulate matter can leak past seals between the ball and the valve seats and become jammed in all surfaces of the valve. This often results in the valve not achieving integrity of sealing. In such cases this type of ball valve is unable to operate properly in such conditions.

The second type of ball valve mechanism which effects the abovementioned function is known as the "floating ball system". In this system the ball is not positionally constrained relative to the valve body. Rotation is caused by the application of force to a point which is offset from the ball centre which, in conjunction with the mating curvatures of the ball and seat, cause the ball to rotate. Sealing occurs as a result of the ball "floating" onto the valve seat. The advantage of this mechanism is that the reliability of the seal is increased because the sealing force develops in proportion to the circular area of the ball to seat contact. The disadvantage of this type of mechanism is that the rotational reliability is reduced as the friction factor between the ball and seat are considerably larger than that of trunnion mounted devices. With aggressive types of wells and particulate flows of the type described above, the reliability of this valve creates a problem in that the valve seizes between the open and the closed position giving rise to serious problems in both operational and safety terms.

An object of the present invention is to provide improved ball valve which obviates or mitigates at least one of the aforementioned disadvantages.

SUMMARY OF THE INVENTION

This is achieved by allowing a very slight movement of a ball valve retaining mechanism to allow that the ball element to be unloaded off the valve seat during rotation, but remain in contact with the valve seat so as to prevent debris ingress between the ball and the valve seat, and to instantaneously reload onto the valve seat upon the event of closure. This instantaneous and automatic redirection of the reaction load path at the occurrence of closure provides an effective seal against high pressure aggressive fluids to prevent fluid escaping beyond the valve components whilst, at the same time, allowing effective rotational movement of the valve to occur without providing rotational reliability.

This solution allows conflicting load paths through the valve to be resolved, namely through the trunnion during rotation and through the valve seat during sealing.

The slight movement of the ball retaining mechanism which is required may be variable depending on a number of factors but requires to be only very slight and in the preferred arrangement hereinafter described is of the order of 0.025" (0.60 mm).

According to one aspect of the present invention, there is provided a ball valve structure comprising:

- a valve housing having a wall defining a housing bore having a longitudinal bore axis,
- an apertured ball element disposed within a ball cage, said ball element and said ball cage being disposed within said bore for rotation between a first position in which said ball element is oriented such that the aperture of the ball element is aligned with the bore, this position defining a valve open position, and a second position in which said ball element is rotated through approximately 90° such that said ball element fully obstructs said bore, this position being defined as the closed position,
- piston means disposed within said housing and coupled to said ball element such that movement of said piston means in the direction of the longitudinal axis of said bore causes said ball element to rotate between said open and said closed position,
- valve seat means disposed downstream of said ball element between said ball element and a valve housing cap, said valve seat means being coupled to first resilient means for applying a first spring force for biasing said valve seat into contact with said ball element as it moves between said open and said closed positions,
- compression spring means coupled to said piston means and responsive to movement of said piston means to move between a first position defining a first compressive spring force sufficient to maintain said ball element in said closed position and a second compressed position in which said piston is actuated to move that said ball element to said open position, said first compression spring means being retained in a direction substantially parallel to said longitudinal bore axis within said housing by a top plate means and by said lower plate means,
- a generally tubular mandrel coupled to said ball cage and to said bottom plate means, such that said mandrel, said ball cage and ball element and said valve seat are constrained to be moved together, second resilient means disposed between the bottom plate means and said valve housing for applying a second spring force to said mandrel assembly for biasing said mandrel assembly, said ball element and said ball cage towards said valve seat, said second spring force being selected to be less than the force of said compression spring means when said ball element is in said open and closed position but greater than the spring force of said first resilient means when said ball valve is in the closed position, the arrangement being such that in response to an applied force said piston means is moveable to rotate said ball element to an open position and to compress said compression spring means to a compressed state in which a compressed spring force in said compressed state which is greater than the second spring force applied by said second resilient means, and the first resilient means applies said first spring force to said valve seat to bias said valve seat to remain in contact with said ball element in said open position and, in the absence or removal of the force applied to said piston means, said compression spring means urges said piston means towards said housing cap such that such ball element is rotated by substantially 90° to a just-closed position where said top plate means abuts said tubular mandrel to limit the decompression of said first compression spring means and, substantially instantaneously, said second resilient means urges said tubular mandrel, said ball cage and said ball element upwardly by a minimal amount relative to said piston means against said valve seat to create a valve closed intensifying condition to provide a relatively strong and effective initial seal between said valve seat and said ball element.

Preferably, said piston means is a tubular or annular piston having apertures in an interior wall thereof for receiving pins or trunnions coupled to said ball element such that rectilinear movement of said piston within said valve housing causes said ball element to rotate substantially 90° between a fully open and a fully closed position.

Preferably also, said ball cage surrounds the ball element and provides a sealed unit as said ball element rotates to prevent passage of debris from the bore of said housing to the components of the ball valve.

Advantageously, said compression spring means is provided by a stack of radially, and circumferentially, spaced helical coil springs, each coil spring bring retained between said top plate means and said lower plate means, said top plate means being moveable with said springs in response to force applied from said piston.

Conveniently, a lower seal ring is coupled to said mandrel beneath said lower plate means.

The second resilient means is provided by a Belleville spring disposed between the base of the lower seal ring and the valve housing. Similarly, the first resilient means is provided by a Belleville spring, which is coupled between the valve seat and the housing cap, for biasing valve seat into contact with said ball element.

Conveniently, said valve housing cap has a port and conduit to the interior of said housing cap for receiving hydraulic fluid for actuating said piston to move downwardly against the spring force of helical coil springs.

Conveniently, eighty helical coil springs are disposed around the periphery of the valve housing to supply a spring force of about 50,000 lbs (225 Kilonewtons (Kn)) when the valve is located in the open position and to supply a spring force of approximately 30,000 lbs (135 Kn) when said valve is in a closed position. The lower Belleville spring provides an upward spring force of approximately 25,000 lbs (112 Kn) and the upper Belleville spring provides a downward force of approximately 10,000 lbs (45 Kn).

Conveniently, the distance moved by the assembly of the mandrel, ball cage and ball element and valve seat assembly between the just-closed position and the intensified position is about 0.025" (0.60 mm).

Advantageously, the pin or trunnion coupled to said ball element for rotation of the ball element by said piston is disposed in windows or apertures in said piston with clearance to allow the pin to float axially upwards thereby allowing the valve components to reposition themselves in response to spring forces and hydrostatic end loads to the intensifying condition.

According to another aspect of the present invention, there is provided a method of minimising the ingress of debris between a ball valve element and valve seat as the ball valve is moved between an open and a closed position, the method comprising the steps of, compressing the first compression spring means, having a first uncompressed spring force, to a second position having a second compressed spring force greater than said first compressed spring force, and simultaneously rotating said apertured ball element to said open position, biasing a valve seat into contact with said ball element as the ball element rotates from the open to the closed position, said biasing being achieved using a first resilient means having a resilient spring force, providing a second resilient spring for applying an upward force to an assembly consisting of a mandrel means, a ball cage and ball element and said valve seat, said second resilient spring force being less than the second compressed spring force of said first compression spring means when said valve element is in said open position but being greater than said spring force of said first resilient means, moving the first compression spring means upwardly in the absence or removal of an applied force to cause the ball element to rotate through 90° and to a just-closed piston, retaining said valve seat in contact with said ball element by said first resilient means, and providing an upward biasing force flowing through said mandrel assembly, said ball cage and said ball element so as to move the assembly upwards by a relatively small amount to provide an intensifying effect between said ball element.

In accordance with another aspect of the present invention, there is provided a ball valve for use with said ball valve structure, said improved ball valve comprising an apertured ball valve having pin means coupled thereto for rotating the ball valve between an open and a closed position in response to an applied force, ball cage for surrounding said ball element except in the region of a valve bore, said cage sealingly engaging said valve seat on one side of the ball and being adapted to be coupled to a mandrel on the other wide of the ball thereby providing a mechanical barrier between the movement of debris from the bore of said ball valve structure to working components of said ball valve structure.

Preferably, said cage is formed by two matching split shells which, when coupled together, form the cage surrounding said ball element.

Each shell has a circular window therein for receiving and engaging with the trunnions of the ball element via plain bearings.

Preferably, the lower end of the cage is threaded into the mandrel.

Conveniently, the trunnions engage with a cylindrical piston which is adapted to be move rectilinearly within a valve housing in response to application of hydraulic pressure, such that when pressure is applied, or removed, the piston moves in the direction of the longitudinal axis of the bore such that the ball element moves within said cage between an open and a closed position.

According to a further aspect of the present invention, there is provided a method of equalising pressure across the ball valve in response to an over pressure from above the ball valve, the method comprising the steps of:

exposing a portion of the main valve actuating means to bore pressure above said valve element, causing downward movement of said valve actuating means in response to said over pressure to rotate the ball partially open to allow pump through of fluid.

It will be understood that the valve seat spring maintains the valve seat in contact with the ball element throughout the pressure equalisation process.

BRIEF DESCRIPTION OF THE DRAWINGS

These and other aspects of the invention will be become apparent from the following description when taken in combination with the accompanying drawings in which

FIG. 3 depicts a split longitudinal sectional view similar to that shown in FIG. 2 but with the ball valve in the just-closed position;

FIG. 4 depicts a similar view to FIG. 3 but with the ball valve in the closed and intensifying position.

DETAILED DESCRIPTION OF THE PREFERRED EMBODIMENTS

Figure 1:
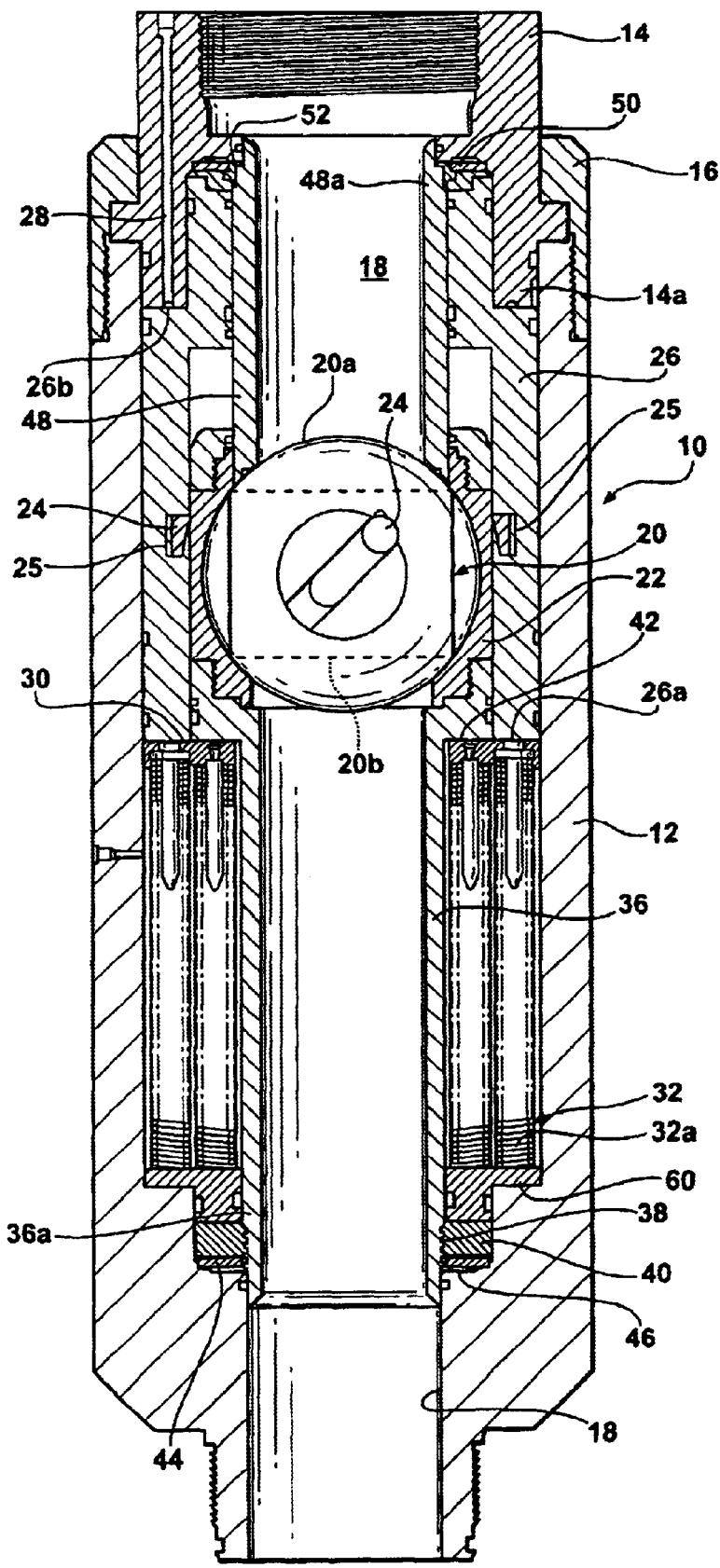
FIG. 1 is a longitudinal sectional view through a ball valve structure in the closed position, in accordance with an embodiment of the present invention.

Reference is first made to FIG. 1 of the drawings which depicts a high integrity ball valve structure, generally indicated by reference numeral 10, which comprises an outer cylindrical housing 12 coupled to a valve housing cap 14 by an annular threaded collet 16.

The valve housing 12 and valve cap 14 define an internal longitudinal bore, generally indicated by reference numeral 18, which extends the length of the housing 12 and along which well fluids can be conveyed or blocked, depending upon whether the valve is open or closed as will be later described.

Figure 2:
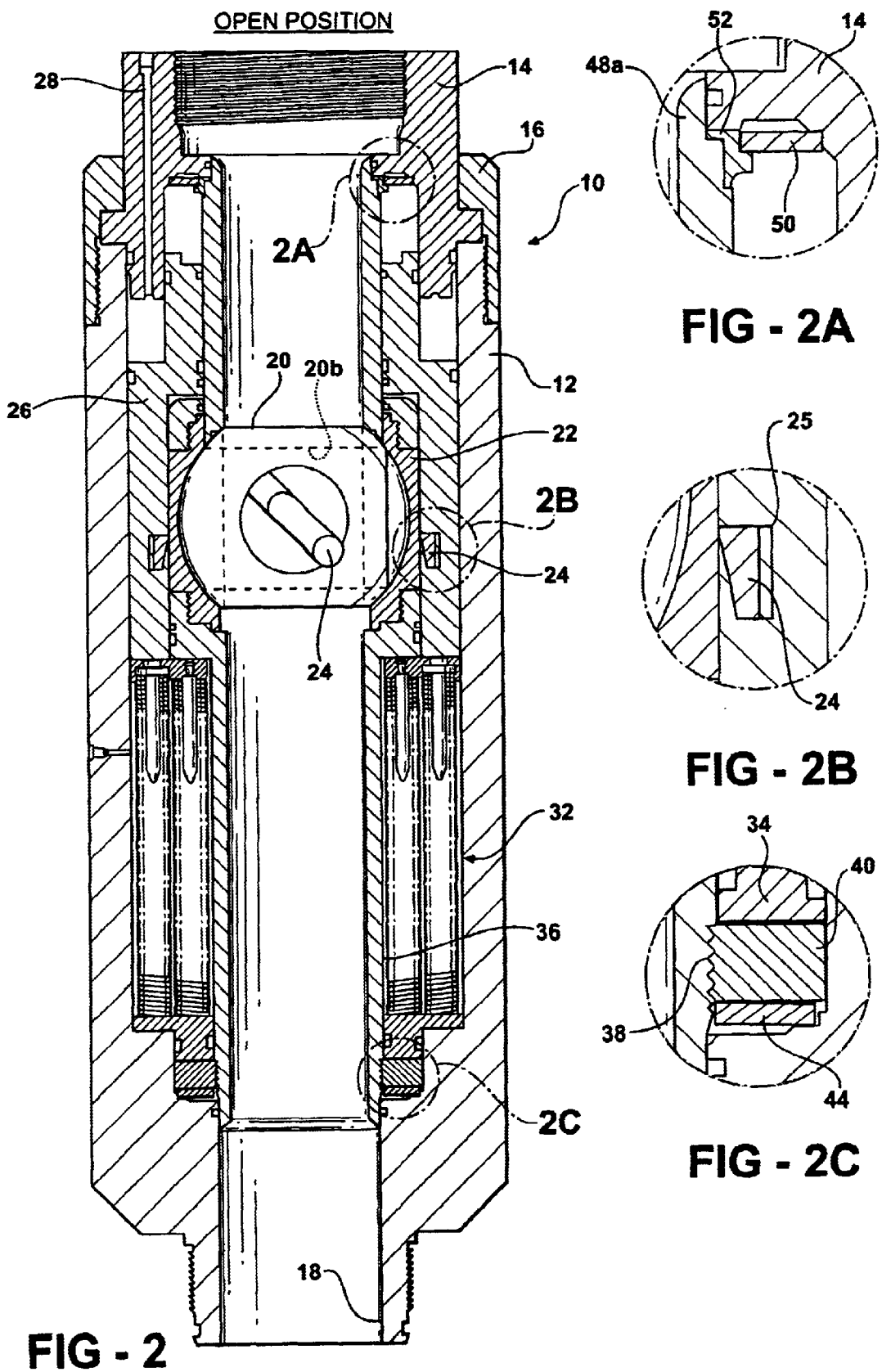
FIG. 2 depicts a diagrammatically longitudinal sectional view of a valve structure in accordance with an embodiment of the invention with the valve shown in the open position and parts of the valve element shown enlarged for clarity.

Disposed within the valve housing is an apertured ball element, generally indicated by reference numeral 20, which, as will be described, is rotatable through 90° between a closed position, as shown in FIG. 1, and a fully open position as shown in FIG. 2.

Figure 5:
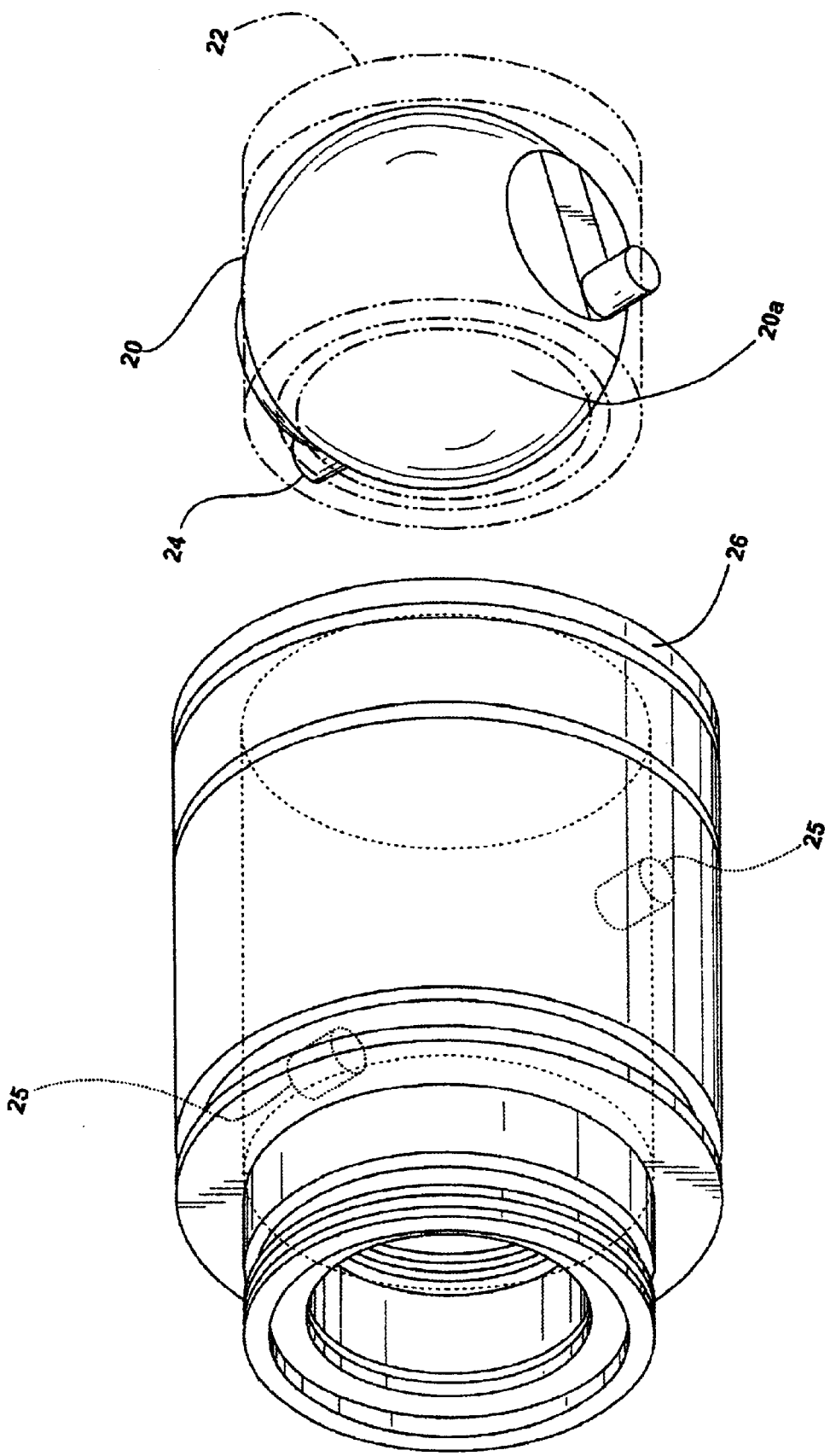
FIG. 5 depicts a computer-aided drawing of an exploded view of part of a ball valve structure showing the ball element located in part of the ball cage assembly for mounting in a generally cylindrical piston in accordance with an embodiment of the present invention.

The ball element 20 is disposed within a ball 22 for totally enclosing the ball, in use, to provide a mechanical barrier against movement of debris from the bore of the tool to the working from components as will also be later described. The apertured ball element 20 has protruding from it sides two cylindrical bosses or trunnions 24, best seen in FIGS. 1 and 5. These trunnions pass through circular apertures in the cage 24 via main bearings for engaging in windows 25 (best seen in FIGS. 1 and 5) in valve actuating means in the form of a cylindrical piston 26. The apertured ball element is of the type disclosed in applicant's co-pending International Patent Application Publication No. WO 90/03255.

The cylindrical piston 26 is shown abutting the lower surface 14a of annular cap 14. On the left side of the annular cap 14 is shown an hydraulic inlet line 28 through which hydraulic pressure can be applied to piston 26 for rotation of the ball valve as will be later described.

It will be seen that the base 26a of the piston 26. abuts a top annular plate 30 or gusset ring 30 beneath which is disposed a magazine of forty nested helical coil compression spring stacks 32, of which four are shown in the interests of clarity. The spring stacks 32 are spaced around the circumference of the housing, and each stack is located between the top annular plate 30 and a lower plate or end seal 34. As will be described, when the piston 26 is moved within the valve housing 16, the spring stacks 32 move between an uncompressed position as shown in FIG. 1 and a compressed position shown in FIG. 2 of the drawings.

The valve cage 22 is threadedly connected to a mandrel 36 which extends longitudinally within the bore 18 of the housing 16. The base 36a of the mandrel 36a has a threaded exterior 38 which is coupled to an external seal ring 40. The upper part of the mandrel 36 has a shoulder region 42 against which abuts the top annular plate 30 so that the maximum uncompressed position of the coil springs is as shown in FIG. 1 of the drawings. Disposed beneath the seal ring 40 is a mandrel Belleville spring 44 which exerts an upward force of approximately 25,000 lbs (112 Kn) on the seal ring 40 and mandrel assembly over a short operating range. The mandrel spring 44 is shown located beneath the seal ring 40 and a shoulder 46 of the housing 16.

The valve cage 22 is threadedly connected to a mandrel 36 which extends longitudinally within the bore 18 of the housing 16. The base 36a of the mandrel 36a has a threaded exterior 38 which is coupled to an external seal ring 40. The upper part of the mandrel 36 has a shoulder region 42 against which abuts the top annular plate 30 so that the maximum uncompressed position of the coil springs is as shown in FIG. 1 of the drawings. Disposed beneath the seal ring 40 is a mandrel Belleville spring 44 which exerts an upward force of approximately 25,000 lbs (45 Kn) on the seal ring 40 and mandrel assembly over a short operating range. The mandrel spring 44 is shown located beneath the seal ring 40 and a shoulder 46 of the housing 16.

Operation of the ball valve will now be described and the description will examine a functional cycle from the fully open position as shown in FIG. 2 to the fully closed position shown in FIG. 3 and the intensified fully closed position shown in FIG. 4.

To orient and maintain the valve in the open position, hydraulic pressure is applied through the open port 28 to the top of the piston 26b. This pressure develops a force which pushes the cylindrical piston 26 onto the top annular plate 30 which bears on the helical coil spring stack 32. The lower end of the spring stack 32 is fixed via lower plate 34 which abuts a shoulder 60 of the valve housing 16. The coil spring stack 32 then bears on the seal ring 34 and retainer ring 40 which is an integral part of the mandrel assembly and the mandrel assembly is, in turn, pushed down onto the body shoulder 46 best seen in lowermost balloon part 62 in FIGS. 3 and 4. The mandrel spring 44 is compressed by the higher force developed by the hydraulics which is transmitted through the highly compressed main spring pack.

As the piston 30 moves down, the trunnions 24 engage with the windows of the piston 26 such that the ball is rotated from the closed position shown in FIG. 1 to the fully open position shown in FIG. 2 such that the bore of the ball element 20b is aligned with the internal bore of the mandrel 36 and the bore of the valve housing 18.

The valve seat spring 50 disposed between the valve seat 48 and the top cap 14 provides a force to the valve seat 48 to "follow" the ball element 20 to the lower position shown in FIG. 2 to maintain a preloaded contact with the surface 20a of the ball element 20 to reduce the possibility of debris from the bore 18, when in the open position shown in FIG. 2, becoming entrained between the valve seat 48 and the surface 20a of the ball element and thus contaminating the valve components.

Thus, in the position shown in FIG. 2 the stack of helical coil springs 32 are compressed and the piston 26 has been moved downwards to rotate the ball valve 20 through 90° to the position shown so that the ball element bore 20b is aligned with the bore 18 of the valve housing 16 to allow fluid flow through the ball valve assembly.

Reference is now made to FIG. 3 of the drawings which depicts the valve in what is known as the "just-closed" position. In this position the hydraulic actuating force has been removed from the piston 26 and the main helical coil spring stack 32 has returned the piston to its uppermost position thereby rotating the ball element through 90° (as was seen in FIG. 1) such that the bore 18 of the valve assembly is blocked to prevent fluid flow therethrough. At this point there is a significant change of reaction load path; the main coil spring stack 32 has closed the valve and pushed the piston 26 through its 3.0" (151.2 mm) stroke. The spring stack 32 simultaneously shoulders out on the underside of the mandrel shoulder 42. This means that the force which was pushing up on the piston 26, and down on the seal ring 40, is now pushing up on the mandrel 36 and down on the seal ring 40. Because the mandrel 36 and seal ring 40 are both part of the mandrel assembly, the force therefore becomes neutral or self-balancing. Therefore, at this particular point the main coil spring stack 32 ceases to have an effect on the position of the mandrel assembly 36 which is hydraulically neutral, that is both the pressure within the bore 18 and the control pressure have no tendency to effect the mandrel position of the assembly.

After the main spring stack has shouldered out on the mandrel shoulder 42, the only external force acting on the mandrel assembly comes from the mandrel spring 44 and the seat spring 50. Because the mandrel string 44 is considerably stronger than the seat spring 50, the mandrel assembly (the mandrel, ball cage and ball element, piston and valve seat) is pushed up until the valve seat 48 shoulders out on the top cap 14 as described above. Although there is no rigid connection between them, the seat and mandrel assembly move as one system due to the preloaded Belleville springs 44,50 at either end of the system.

Reference is now made to FIG. 4 of the drawings which depicts the ball valve when the ball element 20 is in the "intensifying" position. In this position the ball element 20 has been pushed up onto the valve seat 48 by the mandrel spring 44. In addition, the mandrel assembly, ball and valve seat have all moved up 0.025" (0.7 mm) towards the valve cap 14 because of the higher force exerted by the mandrel spring 44 over the seat spring 50. Therefore, the ball element 20 is preloaded onto the valve seat 48 which, in turn, is shouldered out on the top cap 14. Any further forces across the ball element, such as differential pressure, are reacted through this load path thereby providing intensification in proportion to the circular seal contact area.

Still referring to FIGS. 3 and 4, it will be understood that these figures illustrate the transition between the "just-closed" and "intensifying" positions and it will be appreciated that in FIG. 3 the piston 26 returns the trunnion or pin 24 to the fully closed position best illustrated by the bubble 64. Thereafter, the trunnion or pin 224 is allowed to float axially upwards within its connection with the piston 26. This float allows the valve components to reposition themselves in response to spring force and hydrostatic end loads to the intensifying condition shown in FIG. 4. This is why the overall travel of the piston is slightly greater than the actual stroke of the ball (3;000" (151.2mm)). The piston travel includes both the functional stroke (3.000" (151.2 mm)) and the residual force (0.050" (1.2 mm)).

In particular it will be appreciated that by referring to the enlarged bubbles on FIGS. 3 and 4 it will be seen that the travel of the mandrel assembly between the just-closed position and the intensifying position is 0.025" (0.7 mm); this movement being sufficient to provide the aforementioned intensifying effect.

In order to ensure that the piston 26 travels fully home to permit the intensifying effect, it will be understood that a number of the helical coil springs 32a on the radially outer portions of the spring stack 36 are arranged to penetrate through the top plate 30 and act directly on the piston 26 as is best seen in FIG. 1 and bubble 66 in FIG. 4 of the drawings. These springs 32a provide the main part of the force to deliver the piston 26 to the fully up position but additional force is provided for both the functional and residual portions of piston stroke by the seal arrangement between the piston and the tool bore. An inequality of seal diameters between the piston and top cap seal, and between the piston and the mandrel seal means that any pressure in the tool bore has the effect of driving the piston upwards.

It will be readily understood that the ball valve structure hereinbefore described provides both rotational reliability and seal reliability with the result that the ball valve can be used in aggressive wells environment which have hitherto been impossible with existing valves. It will also be understood that, as with the ball valve described in applicant's co-pending application, the ball element may have hardened tungsten carbide edges which are shaped such that actuation of the valve to a closed position provides sufficient force to shear or cut coil tubing and comply with relevant safety requirements.

It will also be understood that the ball valve structure hereinbefore described includes other features which improve the operational reliability. For example, the totally enclosed cage 22 engages above the ball 20 with the seat 48 and below the ball with the mandrel 36. The cage 22 provides a mechanical barrier against the movement of debris from the bore 18 of the valve structure to the working components of the valve. It is important for the functionality of the valve that any pressure in the bore 18 is allowed to act through the cage and consequently the cage is not pressure retaining in any way.

The mechanism by which the valve pumps through (equalises in response to an overpressure from above) is also improved in relation to prior art ball valve structures. Previously equalisation of pressure occurred as a result of the ball floating away axially from the seat thereby creating an annular flow path between two components. This annular flow path resulted in debris becoming trapped between the ball and the seat when the differential pressure was removed. This is minimised with the present structure because the pump through mechanism now maintains the valve seat 48 in constant contact with the ball surface 20a. A portion of the main cylindrical actuation piston 26 is exposed to bore pressure above the ball element 20. When a positive differential pressure is created above the valve, it acts on this portion of the piston 26 which moves downwardly in response. Hence, the ball 20 rotates to a partially open position to allow pump through of fluid. The seat spring 50 maintains contact between the ball surface 20a and the valve seat 48 throughout the process.

Wiper seals have been included in front of all hydraulic seals which are exposed to production water surfaces. These wiper seals displace any debris and protect the hydraulic seals and the respective mating surfaces.

It will be appreciated that various modifications may be made to the valve structure hereinbefore described without departing from the scope of the invention. For example, although the valve structure requires 40 helical coil springs it will be appreciated that any suitable number may be used depending on the spring strength. In addition, the exact spring tensions of the mandrel spring, seat spring and compression strings may be varied, although it is a requirement that the spring force of the mandrel spring be greater than the seat spring sufficient to allow the mandrel assembly to move up to the intensified position, and the spring force in the coil spring stack when in the just-closed position, must be greater than the spring force of the mandrel spring.

It will be appreciated that the valve housing and internal valve structure may be of any suitable shape to allow the components to be disposed in the valve housing sufficient to achieve the function hereinbefore described, namely that there is an upward movement of the assembly to create an intensified position when the valve is fully closed. It will also be understood that premium corrosion-resistant materials are preferred.

The principal advantage of the invention over the prior art is that it provides the ball valve structure with both rotational reliability and seal reliability such that it can be used in aggressive well environments. The design minimises the possibility of the mechanism binding because the valve seat stays in contact with the ball element throughout its rotation and this also eliminates the possibility of debris ingress between the ball and the seat. The provision of wiper seals also protects the hydraulic seals from debris damage and because the ingress of debris is minimised to working components, the component life is increased and this reduces replacement frequency. This effectively increases the working life of the valve. The coil spring stack also provides an increase failsafe close spring force which also provides increased passive cutting capacity. Furthermore, because rotational friction forces are minimised valve closure times are significantly reduced.

What is claimed is:

1. A method of minimising the ingress of debris between a ball valve element and valve seat as a ball valve is moved between an open and a closed position, the method comprising the steps of, compressing a first compression spring means having a first uncompressed spring force in a first position, to a second position having a second compressed spring force greater than said first spring force, and simultaneously rotating said apertured ball element to said open position, biasing a valve seat into contact with said ball element as the ball element rotates from the open to the closed position by a first resilient means having a resilient spring force, providing a second resilient means for applying an upward force to an assembly comprised of a mandrel means, a ball cage and ball element and said valve seat, said upward force being less than the second compressed spring force of said first compression spring means when said valve element is in said open position but being greater than said spring force of said first resilient means, moving the first compression spring means upwardly in the absence of an applied force to cause the ball element to rotate through 90° to a just-closed piston, retaining said valve seat in contact with said ball element by said first resilient means, and providing an upward biasing force flowing through said mandrel assembly, said ball cage and said ball element so as to move the assembly upwards by a relatively small amount to provide an intensifying effect between said ball element and said valve seat.

2. A ball valve structure comprising:

a valve housing having a wall defining a housing bore having a longitudinal bore axis, an apertured ball element disposed within a ball cage, said ball element and said ball cage being disposed within said bore for rotation between a first position in which said ball element is oriented such that the aperture of the ball element is aligned with the bore, this position defining a valve open position, and a second position in which said ball element is rotated through approximately 90° such that said ball element fully obstructs said bore, this position being defined as the closed position, piston means disposed within said housing and coupled to said ball element such that movement of said piston means in the direction of the longitudinal axis of said bore causes said ball element to rotate between said open and said closed position, valve seat means disposed downstream of said ball element between said ball element and a valve housing cap, said valve seat means being coupled to first resilient means for applying a first spring force for biasing said valve seat into contact with said ball element as it moves between said open and said closed positions, compression spring means coupled to said piston means and responsive to movement of said piston means to move between a first position defining a compressive spring force sufficient to maintain said ball element in said closed position and a second compressed position in which said piston is actuated to move said ball element to said open position, said compression spring means being retained in a direction substantially parallel to said longitudinal bore axis within said housing by a top plate means and a lower plate means, a generally tubular mandrel coupled to said ball cage and to said bottom plate means, such that said mandrel, said ball cage and ball element and said valve seat means are constrained to be moved together, second resilient means disposed between the bottom plate means and said valve housing for applying a second spring force to said mandrel assembly for biasing said mandrel assembly, said ball element and said ball cage towards said valve seat, said second spring force being selected to be less than said compression spring force when said ball element is in said open position and in said closed position but greater than said first spring force when said ball valve is in the closed position, wherein, in response to an applied force said piston means is moveable to rotate said ball element to said open position and to compress said compression spring means to said compressed position in which said compressive spring force in said compressed position is greater than the second spring force applied by said second resilient means, and the first resilient means applies said first spring force to said valve seat to bias said valve seat to remain in contact with said ball element in said open position and, in the absence of the applied force, said compression spring means urges said piston means towards said housing cap such that such ball element is rotated by substantially 90° to a just-closed position where said top plate means abuts said tubular mandrel to limit the decompression of said compression spring means and, substantially instantaneously, said second resilient means urges said tubular mandrel, said ball cage and said ball element upwardly by a minimal amount relative to said piston means against said valve seat to create a valve closed intensifying position to provide a relatively strong and effective initial seal between said valve seat and ball element.

3. A ball valve as claimed in claim 2 wherein said piston means is a tubular or annular piston having apertures in an interior wall thereof for receiving pins coupled to said ball element such that rectilinear movement of said piston within said valve housing causes said ball element to rotate substantially 90° between a fully open and a fully closed position.

4. A ball valve as claimed in claim 2 wherein said ball cage surrounds the ball element and provides a sealed unit as said ball element rotates to prevent passage of debris from the bore of said housing to components of the ball valve.

5. A ball valve as claimed in claim 1 wherein said compression spring means comprises a stack of radially, and circumferentially, spaced helical coil springs, each coil spring being retained between said top plate means and said lower plate means, said top plate means being moveable with said springs in response to force applied from said piston.

6. A ball valve as claimed in claim 2 further comprising a lower seal ring coupled to said mandrel beneath said lower plate means.

7. A ball valve as claimed in claim 2 wherein the second resilient means comprises a Belleville spring disposed between the base of the lower seal ring and the valve housing.

8. A ball valve as claimed in claim 2 wherein the first resilient means comprises a Belleville spring coupled between the valve seat and the housing cap, for biasing the valve seat into contact with the ball element.

9. A ball valve as claimed in claim 5 wherein said valve housing cap further comprises a port and a conduit to the interior of said housing cap in fluid communication with said port for receiving hydraulic fluid for actuating said piston to move downwardly against the spring force of helical coil springs.

10. A ball valve as claimed in claim 5 further comprising eighty helical coil springs disposed around the periphery of the valve housing to supply a spring force of about 50,000 lbs (225 Kilonewtons (Kn)) when the valve is located in the open position and to supply a spring force of approximately 30,000 lbs (135 Kn) when said valve is in the closed position.

11. A ball valve as claimed in claim 2 wherein a distance moved by the mandrel, ball cage and ball element and the valve seat means between the just-closed position and the intensifying position is about 0.025" (0.60 mm).

12. A ball valve as claimed in claim 3 wherein the pins are disposed in said apertures with clearance to allow the pins to float axially upwards thereby allowing the valve components to reposition themselves in response to spring forces and hydrostatic end loads to the intensifying position.

* * * * *